United States Patent [19]
Zen

[11] Patent Number: 5,227,585
[45] Date of Patent: Jul. 13, 1993

[54] SYSTEM OF TUBES AND CONNECTION BLOCKS TO CONTAIN ELECTRIC TELEPHONE AND TELEVISION CABLES

[76] Inventor: Sergio Zen, 18 Via Macello, Cittadella (Padova), Italy, 35013

[21] Appl. No.: 749,950

[22] Filed: Aug. 26, 1991

[30] Foreign Application Priority Data

Aug. 30, 1990 [IT] Italy .................. 41679 A/90
Jul. 15, 1991 [IT] Italy ........................ 123/91

[51] Int. Cl.⁵ .............................................. H02G 3/04
[52] U.S. Cl. ...................................... 174/95; 138/115; 138/117; 138/162; 174/97; 174/88 R; 174/88 S
[58] Field of Search ................. 174/95, 97, 101, 88 R, 174/88 S; 439/403, 417, 418; 138/115, 116, 117, 162

[56] References Cited

U.S. PATENT DOCUMENTS

| | | | |
|---|---|---|---|
| 1,785,403 | 12/1930 | Babb | 138/115 |
| 3,476,869 | 11/1969 | Hawkins | 138/115 |
| 3,804,971 | 4/1974 | Bazille, Jr. | 174/88 R |
| 3,821,688 | 6/1974 | Larsile | 174/101 X |
| 4,374,881 | 2/1983 | Hamilton | 174/97 X |
| 4,530,865 | 7/1985 | Sprenger | 428/36 |
| 4,552,429 | 11/1985 | Van Alst | 439/403 X |
| 4,582,093 | 4/1986 | Hubbard et al. | 174/95 X |
| 4,602,124 | 7/1986 | Santucci | 174/101 |
| 4,729,409 | 3/1988 | Paul | 174/68 C X |
| 4,864,082 | 9/1989 | Ono et al. | 174/97 |
| 5,009,612 | 4/1991 | Rishworth et al. | 439/403 |

FOREIGN PATENT DOCUMENTS

| | | | |
|---|---|---|---|
| 2588425 | 4/1987 | France | 174/97 |
| 757357 | 9/1956 | United Kingdom | 174/97 |

Primary Examiner—Morris H. Nimmo
Attorney, Agent, or Firm—Dowell & Dowell

[57] ABSTRACT

A system of tubes and connector blocks to contain electrical, telephone and television cables. The tubes and the blocks are divided by walls which create separated cavities to contain the cables.

16 Claims, 4 Drawing Sheets

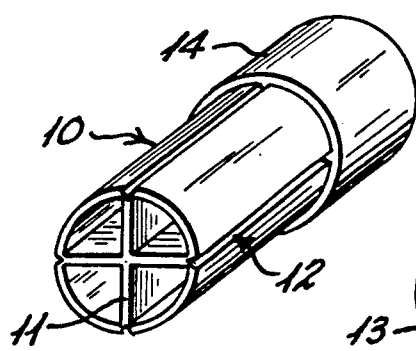
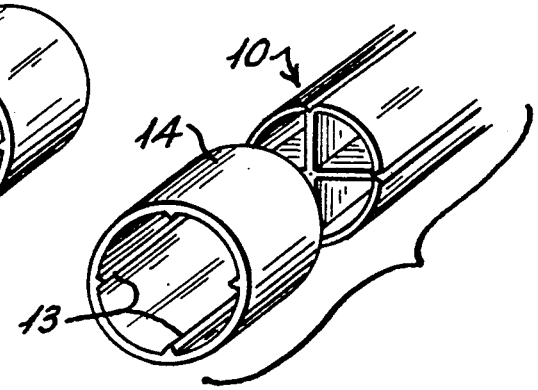
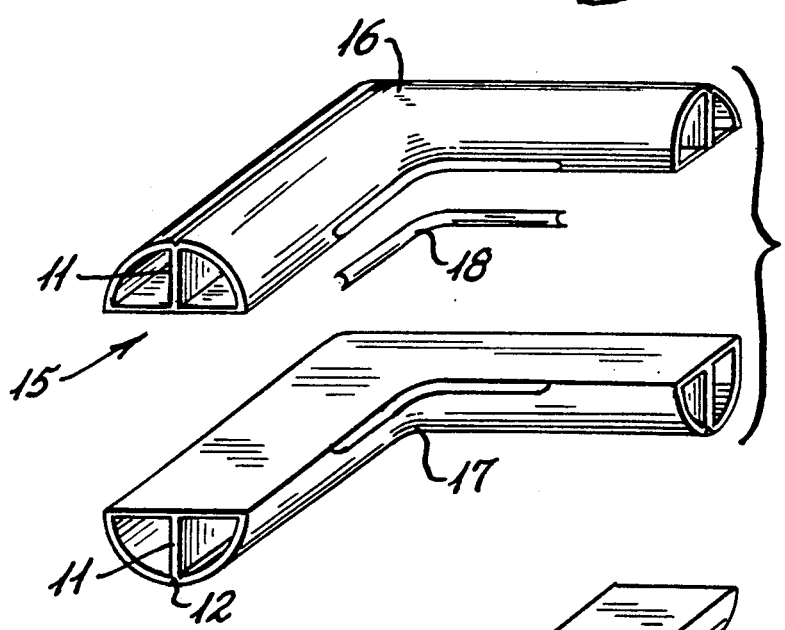
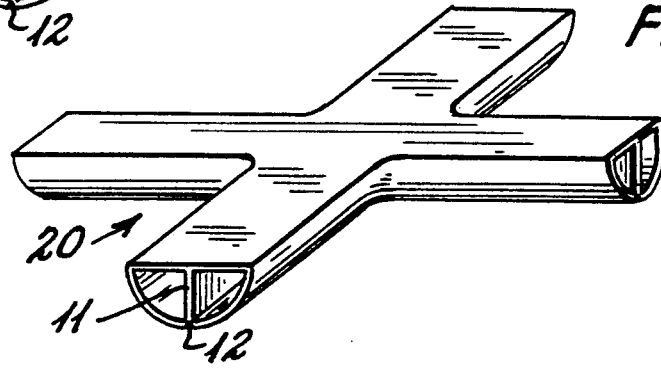
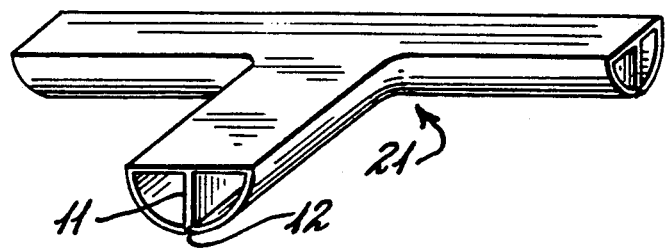

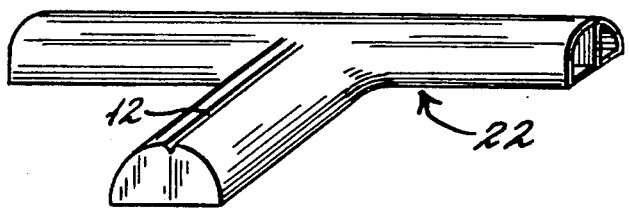
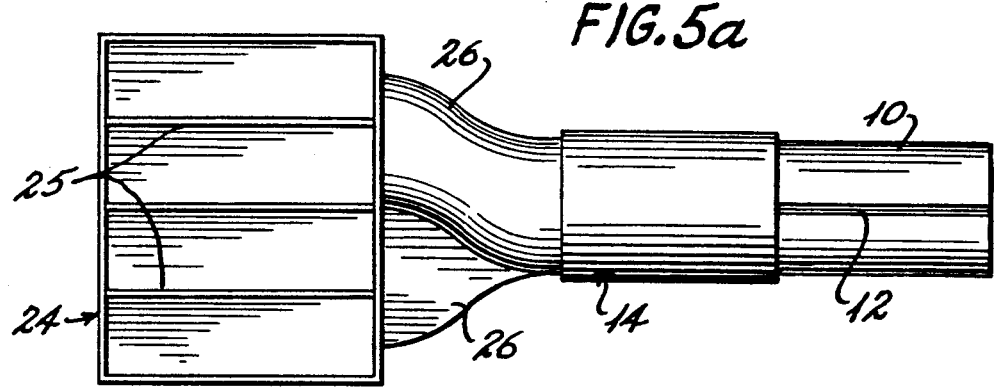
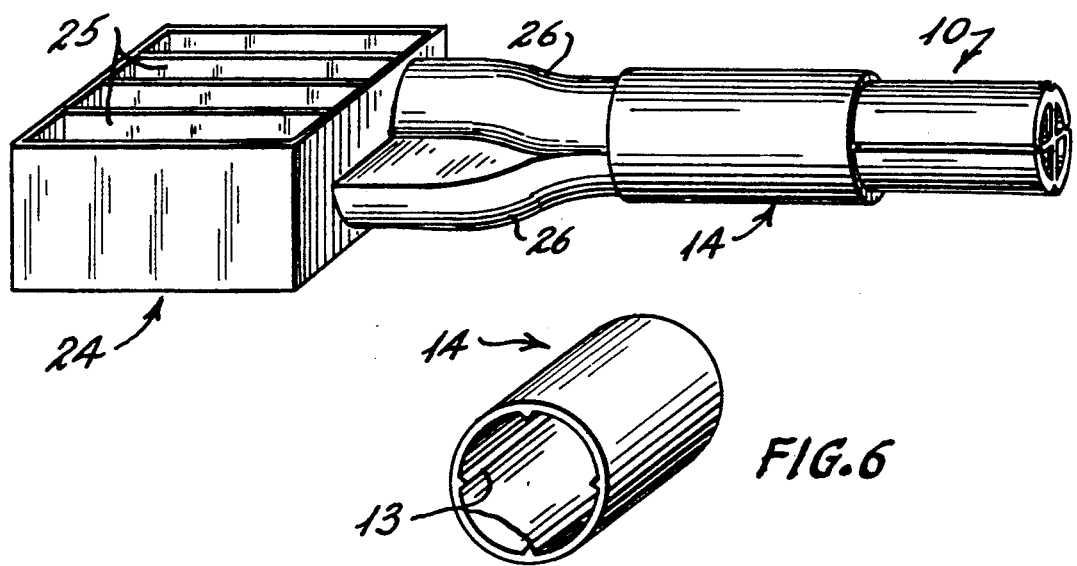

SYSTEM OF TUBES AND CONNECTION BLOCKS TO CONTAIN ELECTRIC TELEPHONE AND TELEVISION CABLES

BACKGROUND OF THE INVENTION

1. Field of the Invention

The present invention relates to the field of plant engineering and in particular to tubes to contain electric, television and telephone cables and the like.

2. History of the Related Art

The safety regulations regarding electric installations impose the creation of separate lines for the various types of cable.

The tubes in use up to the present time have a single channel, and therefore to create different lines a number of tubes must be used; these tubes are then laid side-by-side and fixed to walls by means of staples.

This type of solution is unaesthetic. Furthermore, it is extremely difficult, once a line has been installed, to substitute or add a new cable within the same tube, as the existing cables hinder the passage of the new cable.

SUMMARY OF THE INVENTION

The invention described in the present application solves these problems thanks to a single tube and a connector block divided into various sectors, creating two or more separate lines.

The invention is essentially formed by tubes and connector blocks divided into cavities which are separated by dividing walls.

The tubes can be of varying cross-section, and are provided with one or more dividing walls in such a way as to have, throughout their length, two or more cavities.

For joining, each tube is provided with a joint sleeve at its head. The joint sleeve is provided in its inner part with several small teeth which fit in corresponding grooves made on the outside of the tube.

The grooves are made throughout the length of the tube, and guarantee the exact positioning of the joint sleeve on the tube, and therefore the perfect correspondence of the dividing walls and of the cavities in the two coupled tube sections.

For corners, curved tubes of semicircular section have been made, which are placed side-by-side with their flat surfaces together and are joined by couplings or joint sleeves, thus forming a complete tube of circular section.

For the various installation requirements, T-junction and cross-shaped junction elements having a semicircular section are provided. These junction elements are provided with dividing walls which form distinct channels; during installation they are placed side-by-side with their flat surfaces together, thus forming a circular tube with a number of distinct channels.

To join the tubes to connector blocks, which are also internally divided by dividing walls, junction elements have been made, formed by tubes of semicircular section with an S-bend in them. The tubes are divided into a number of channels by dividing walls. With this system it is therefore possible to form complete lines provided with junction elements and connector blocks.

The connector block and/or line breaker is internally divided and makes it possible to keep the cables of different lines separate even within the connector block.

The block is provided in its upper part with dividing walls which divide it into cavities, into which the cables fed from the various cable-bearing tubes are inserted. In particular the cables from homologous cavities of the various tubes are channelled, by a system of internal walls, of channels or otherwise, into the same internal portion of the connector block in such a way as to maintain the logical order and connections between the various cables fed from the various tubes connected to the block.

The connector block is substantially made up of three parts: a base with channels, with above it a grid with orthogonal dividing walls and an upper cover for closing.

To the base are connected two or more cable-bearing tubes having a number of cavities. On the base, independent channels are made which, each one starting from one cavity of the tube, lead to the upper surface of the base.

The dividing grid, when placed on the base, forms cavities, into each one of which lead the channels coming each from a different connection point of the tubes and the single channels.

BRIEF DESCRIPTION OF THE DRAWINGS

FIG. 1 is a perspective end view of one of the divided tubes and joint sleeves of the present invention.

FIG. 2 is a perspective end assembly view of the tube of FIG. 1.

FIG. 3 is a perspective assembly view of one of the corner tubes of the present invention.

FIG. 4a is a perspective view of the lower half of a cross junction tube of the present invention.

FIG. 4b is a perspective view of the lower half of a T-shaped tube of the present invention.

FIG. 4c is a perspective view of the upper half of a modified T-shaped tube.

FIG. 5a is a top plan view of the joint sleeve and tube of FIG. 1 joined by arcuate tube segments to a divided junction box.

FIG. 5b is a perspective view of the combination of elements of FIG. 5a.

FIG. 6 is a perspective view of the joint sleeve of FIGS. 5a and 5b.

DESCRIPTION OF THE PREFERRED EMBODIMENTS

Figure 7:
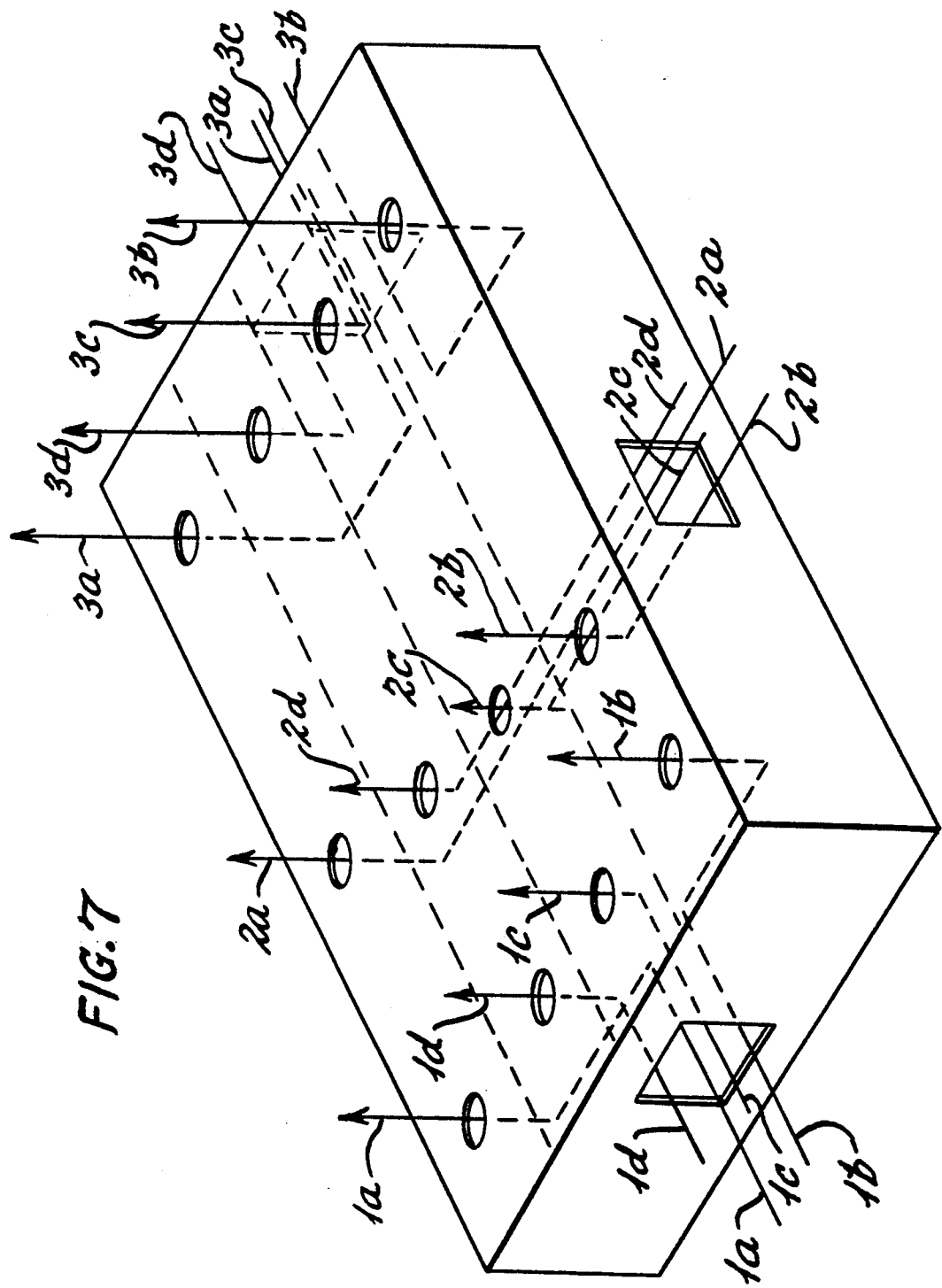
FIG. 7 is a schematic illustrational view of the routing of four cables through the separate cavities or channels of three different tubes which are connected to a common junction box in accordance with the teachings of the present invention.

As a non-limiting example, an illustration is given of a practical embodiment of the invention.

FIG. 1 shows a tube 10 with four internal dividing walls 11 which divide the tube into four parts; on the outer surface of the tube are formed grooves 12 into which are seated teeth 13 formed on the inner surface of a joint sleeve 14 into which the successive tube is inserted.

FIG. 2 shows the joint sleeve 14 of a tube 10, in which it is possible to see the teeth capable of being tracked into the notches on the tube.

FIG. 3 shows a corner tube 15 divided into an upper part 16 and a lower part 17 joined together by couplings 18; this tube is also provided with grooves 12 made upon its outer surface.

FIG. 4a shows a junction element 20 in the shape of a cross, formed by half tubes capable of being placed one on top of the other and which when connected by couplings form a circular tube. The junction is provided with dividing walls 11 which divide it into a number of cavities, and with grooves 12 for perfect connection to the tubes.

FIG. 4b shows a T-shaped junction element 21, in which it is possible to note the internal divisions made by the dividing walls 11, and the grooves 12 into which are slotted the joint sleeves 14 or the sleeves for connection with other tubes.

FIG. 4c shows a T-shaped junction 22 having internal channels on the longitudinal axis only, while the side arm 23 of said junction is not connected to the channels; in this way, by placing this element, flat surface to flat surface, on the T-shaped junction element shown in FIG. 4b, it is possible to obtain other T-shaped elements of tubular section.

FIG. 5a shows a plan view of a connector block 24 provided with dividing walls 25 and connected to a tube 10 by means of two junction elements 26 formed by half tubes in the shape of an S and by a sleeve 14.

FIG. 5b shows the same connector block 24 clearly showing the dividing walls 25, the two S-shaped half tubes 26 and the sleeve 14 connecting the two S-shaped half tubes to a tube 10.

FIG. 6 shows the sleeve 14 provided with teeth 13 formed on its inner surface, for connecting two tubes and/or junction elements without joint sleeves.

In FIG. 7 is schematically shown the distribution of the various cables in the base of the connector block 24 to which three tubes are connected, A dividing grid is then placed over the base illustrated. The cables are shown as 1a, 1b, 1c and 1d, 2a, 2b, 2c and 2d, and 3a, 3b, 3c and 3d.

Each cable from a single tube leads, through channels made within the base, out into a different area shut off by the dividing walls 25, shown in the figure by dotted lines; consequently cables each coming from a different tube are fed into each area of the dividing grid.

Figure 8:
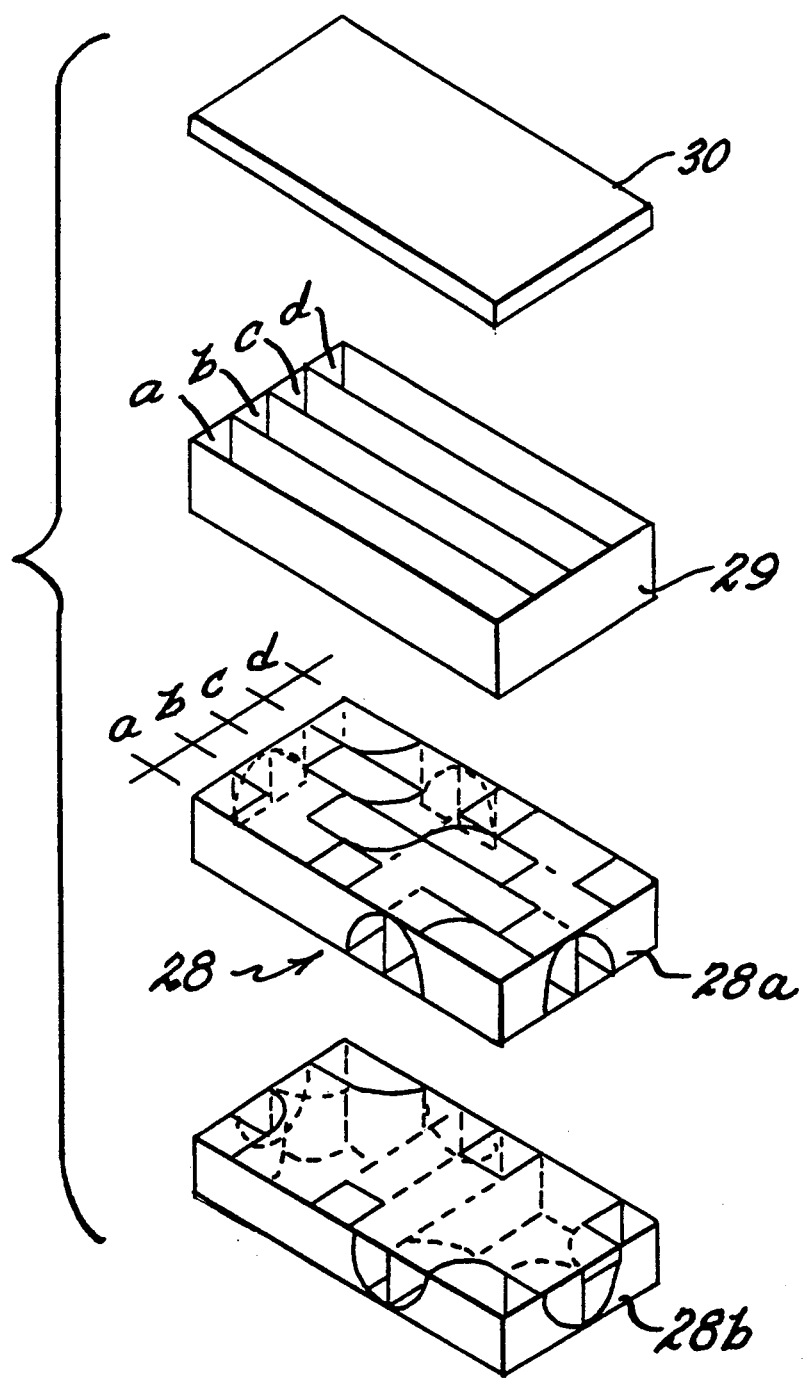
FIG. 8 is a perspective assembly view of a modified connector or junction box of the present invention.

FIG. 8 shows an assembly view of the base 28, of the dividing grid 29 and of the cover 30 of a modified connector block.

The base, for ease of representation, has been divided horizontally into two elements 28a and 28b, each of which contains the channels from two cavities of each of the tubes connected thereto. With a dotted line are shown the horizontal channels within the semi-base, whereas with a thick black line are shown the parts of vertical channels which lead to the surface of the semi-base itself in one of the areas (a, b, c, d) formed by the dividing grid.

In particular the channels are made in the semi-base in such a way as to feed into the same area, formed by the dividing walls of the upper grid. The cables coming from cavities in the tubes connected, for example all the cables from the lower right hand cavities of all the tubes are fed into the first area, the cables from the lower left-hand cavities into the second area, the cables from the top right-hand cavities into the third area, the cables from the top left-hand cavities into the fourth area.

The above schematic description is sufficient for a person skilled in the art to realize the invention, consequently, in effective application, variations to the same can be made without prejudicing the inventive concept.

I claim:

1. A system of tubes and connector blocks to contain electrical, telephone and television cables comprising, each of said tubes including at least one inner dividing wall extending along the length thereof thereby dividing the tubes into distinct cavities, a number of said tubes including opposing sections which are semicircular in cross section and which have opposing flat wall portions, and means for retaining said opposing sections in abutting relationship to thereby define tubes having circular cross sections.

2. The system of claim 1 in which said connector blocks include dividing walls for dividing said connector blocks into at least two separate sections.

3. The system of claim 2 in which at least one of said number of tubes is curved having end portions which are oriented generally perpendicularly with respect to one another.

4. The system of claim 3 in which each of said opposing sections includes an outer surface, a groove extending longitudinally in said outer surface of each of said sections, said means for retaining said opposing sections in abutting relationship including a tubular sleeve having an inner surface, and at least one tooth means extending outwardly from said inner surface of each sleeve of a size to be engageable within one of said grooves.

5. The system of claim 2 in which at least one of said number of said tubes is generally S-shaped.

6. The system of claim 5 in which each of said opposing sections includes an outer surface, a groove extending longitudinally in said outer surface of each of said sections, said means for retaining said opposing sections in abutting relationship including a tubular sleeve having an inner surface, and at least one tooth means extending outwardly from said inner surface of each sleeve of a size to be engageable within one of said grooves.

7. The system of claim 2 in which at least one of said number of tubes is generally T-shaped.

8. The system of claim 7 in which each of said opposing sections includes an outer surface, a groove extending longitudinally in said outer surface of each of said sections, said means for retaining said opposing sections in abutting relationship including a tubular sleeve having an inner surface, and at least one tooth means extending outwardly from said inner surface of each sleeve of a size to be engageable within one of said grooves.

9. The system of claim 2 in which at least one of said number of tubes is generally cross-shaped.

10. The system of claim 9 in which each of said opposing sections includes an outer surface, a groove extending longitudinally in said outer surface of each of said sections, said means for retaining said opposing sections in abutting relationship including a tubular sleeve having an inner surface, and at least one tooth means extending outwardly from said inner surface of each sleeve of a size to be engageable within one of said grooves.

11. The system of claim 1 in which each of said opposing sections includes an outer surface, a groove extending longitudinally in said outer surface of each of said sections, said means for retaining said opposing sections in abutting relationship including a tubular sleeve having an inner surface, and at least one tooth means extending outwardly from said inner surface of each sleeve of a size to be engageable within one of said grooves.

12. The system of claim 2 including at least one connector block having a housing including spaced inlets and spaced outlets, a number of separate channels within said housing extending between each of said inlets and outlets, each of said inlets, outlets and channels having a number of separate cavities equal in number to the cavities of said plurality of tubes.

13. The system of claim 12 including cover means for covering said housing for permitting access to said separate channels.

14. A system of tubes and connector blocks for containing electrical, telephone and television cables comprising, a plurality of tubes each having inner and outer surfaces, at least one inner dividing wall extending along the length of said plurality of tubes thereby forming distinct cavities therein, at least one groove in said outer surface of each of said plurality of tubes and extending longitudinally thereof, and a plurality of sleeve mean for joining said plurality of tubes in aligned relationship, each of said sleeve means having an inner surface complimentary in configuration with respect to said outer surfaces of said plurality of tubes, and at least one tooth means extending from said inner surface of each sleeve means of a size to be slidingly received within said groove.

15. The system of claim 14 in which each of said plurality of tubes includes at least one pair of generally oppositely oriented grooves and each sleeve means including at least one pair of oppositely oriented tooth means.

16. The system of claim 15 in which each of said plurality of tubes includes opposing sections, each of said opposing sections including one of said grooves, said sections being retained in assembled relationship by one of said sleeve means.

* * * * *